(12) United States Patent
Koo et al.

(10) Patent No.: US 7,016,699 B2
(45) Date of Patent: *Mar. 21, 2006

(54) OUTER LOOP TRANSMIT POWER CONTROL USING CHANNEL-ADAPTIVE PROCESSING

(75) Inventors: Chang-Soo Koo, East Northport, NY (US); Ariela Zeira, Huntington, NY (US); Donald Grieco, Manhassett, NY (US); Sung-Hyuk Shin, Fort Lee, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 113 days.

This patent is subject to a terminal disclaimer.

(21) Appl. No.: 10/663,528

(22) Filed: Sep. 12, 2003

(65) Prior Publication Data
US 2004/0063453 A1   Apr. 1, 2004

Related U.S. Application Data

(63) Continuation of application No. 10/036,118, filed on Dec. 26, 2001, now Pat. No. 6,622,024.

(60) Provisional application No. 60/323,541, filed on Sep. 20, 2001.

(51) Int. Cl.
 *H04B 7/00* (2006.01)
(52) U.S. Cl. .................... 455/522; 455/450; 455/452.1
(58) Field of Classification Search ............... 455/522, 455/69, 73, 450, 517, 403, 452.1; 370/276, 370/277, 280, 294, 318
 See application file for complete search history.

(56) References Cited

U.S. PATENT DOCUMENTS

| | | | |
|---|---|---|---|
| 5,515,365 A | 5/1996 | Sumner et al. | |
| 5,542,111 A * | 7/1996 | Ivanov et al. | 455/522 |
| 5,987,020 A * | 11/1999 | Abe | 370/347 |
| 6,151,328 A | 11/2000 | Kwon et al. | |
| 6,285,886 B1 * | 9/2001 | Kamel et al. | 455/522 |
| 6,298,241 B1 * | 10/2001 | Hong | 455/522 |
| 6,373,823 B1 | 4/2002 | Chen et al. | |
| 6,393,276 B1 * | 5/2002 | Vanghi | 455/422.1 |
| 6,396,867 B1 * | 5/2002 | Tiedemann et al. | 375/141 |
| 6,400,960 B1 * | 6/2002 | Dominique et al. | 455/522 |
| 6,466,547 B1 * | 10/2002 | Lim et al. | 370/241 |
| 6,757,320 B1 * | 6/2004 | Tiedemann et al. | 375/141 |
| 6,876,868 B1 * | 4/2005 | Crocker et al. | 455/522 |
| 6,909,880 B1 * | 6/2005 | Kojima et al. | 455/522 |
| 6,931,257 B1 * | 8/2005 | Shahidi et al. | 455/522 |
| 2002/0021682 A1 * | 2/2002 | Ariyoshi et al. | 370/335 |
| 2002/0167907 A1 * | 11/2002 | Sarkar et al. | 370/252 |
| 2003/0156554 A1 * | 8/2003 | Dillinger et al. | 370/318 |
| 2004/0116142 A1 * | 6/2004 | Wang et al. | 455/522 |
| 2005/0085256 A1 * | 4/2005 | Yano et al. | 455/522 |

* cited by examiner

*Primary Examiner*—Sonny Trinh
(74) *Attorney, Agent, or Firm*—Volpe and Koenig, P.C.

(57) ABSTRACT

The present invention is a system and method which controls outer loop transmit power for transmission power of an uplink/downlink communication in a wireless communication system. The system receives a communication from a base station and determines an error rate on the received communication. The system then distinguishes between static and dynamic channels, produces a static adjustment value, and characterizes the dynamic channels to generate a dynamic adjustment value. The target power level is then adjusted by the static and dynamic adjustment values, setting the transmission power level.

29 Claims, 8 Drawing Sheets

OUTER LOOP TRANSMIT POWER CONTROL USING CHANNEL-ADAPTIVE PROCESSING

CROSS REFERENCE TO RELATED APPLICATIONS

The application is a continuation of Ser. No. 10/036,118 filed on Dec. 26, 2001 now U.S. Pat. No. 6,622,024 which claims priority from Provisional Patent Application No. 60/323,541, filed Sep. 20, 2001.

BACKGROUND

The present invention relates to spread spectrum time division duplex (TDD) communication systems. More particularly, the present invention relates to a system and method for controlling outer loop transmission power within TDD communication systems.

Spread spectrum TDD systems carry multiple communications over the same spectrum. The multiple signals are distinguished by their respective chip code sequences (codes). Referring to FIG. 1, TDD systems use repeating frames 34 divided into a number of time slots $37_1$–$37_n$, such as fifteen time slots. In such systems, a communication is sent in a selected time slot out of the plurality of time slots $37_1$–$37_n$ using selected codes. Accordingly, one frame 34 is capable of carrying multiple communications distinguished by both time slot and code. The combination of a single code in a single time slot is referred to as a physical channel. Based on the bandwidth required to support a communication, one or multiple physical channels are assigned to that communication.

Most TDD systems adaptively control transmission power levels. In a TDD system, many communications may share the same time slot and spectrum. While user equipment (UE) 22 is receiving a downlink transmission from a base station, all the other communications using the same time slot and spectrum cause interference to the specific communication. Increasing the transmission power level of one communication degrades the signal quality of all other communications within that time slot and spectrum. However, reducing the transmission power level too far results in undesirable signal to noise ratios (SNRs) and bit error rates (BERs) at the receivers. To maintain both the signal quality of communications and low transmission power levels, transmission power control is used.

The purpose of power control is to use the minimum power required to allow each transport channel (TrCH) to operate with the Block Error Rate (BLER) no higher than its required level. The standard approach to TDD downlink power control is a combination of inner and outer loop control. In this standard solution, the UE transmits physical layer transmit power control (TPC) commands to adjust the base station transmission power.

A base station sends a transmission to a particular UE. Upon receipt, the UE measures the signal interference ratio (SIR) in all time slots and compares this measured value to a targetSIR. This target SIR is generated from the BLER signaled from the base station. As a result of a comparison between the measured SIR value with the target SIR the UE transmits a TPC command to the base station. The standard approach provides for a TPC command per coded composite transport channel (CCTrCH). The CCTrCH is a physical channel which comprises the combined units of data for transmission over the radio interface to and from the UE or base station. This TPC command indicates to the base station to adjust the transmission power level of the downlink communication. The base station, which is set at an initial transmission power level, receives the TPC command and adjusts the transmit power level in all time slots associated with the CCTrCH in unison. The inner loop power control algorithm controls transmit power to maintain the received SIR as close as possible to a target SIR by monitoring the SIR measurements of the data. The outer loop power control algorithm controls the target SIR to maintain the received quality BLER as close as possible to a target quality BLER based on the Cyclic Redundancy Code (CRC) check of the data. The output from the outer loop power control is a new target SIR per CCTrCH used for the inner loop power control.

There are four main error sources in transmission power control: 1) channel error; 2) systematic error; 3) random measurement error; and 4) coded composite transport channel (CCTrCH) processing error. The systematic error and the random measurement error are corrected reasonably by the inner loop power control by monitoring the SIR measurements. The CCTrCH processing error is corrected by either the outer loop power control or the inner loop power control by using relative SIR measurements among the codes. The channel error is related to unknown time-varying channel conditions.

In power control systems, the outer loop power control algorithm would set a target SIR for each CCTrCH based on the required target BLER, assuming a most plausible channel condition. Therefore, the mismatch between the target BLER and the mapped target SIR varies depending on the actual channel condition, and it is especially large at very low BLER. Since the outer loop power control depends on the CRC check, it often takes a long time to converge to the required target SIR for the low BLER.

Accordingly, there is a need for outer loop power control which determines the actual channel conditions so that a proper value for the target SIRs is used.

SUMMARY

The present invention is a system and method which controls outer loop transmit power for transmission power of an uplink/downlink communication in a wireless communication system. The system receives a communication from a base station and determines an error rate on the received communication. The system then distinguishes between static and dynamic channels, produces a static adjustment value, and characterizes the dynamic channels to generate a dynamic adjustment value. The target power level is then adjusted by the static and dynamic adjustment values, setting the transmission power level.

DETAILED DESCRIPTION OF THE PREFERRED EMBODIMENTS

Figure 1:
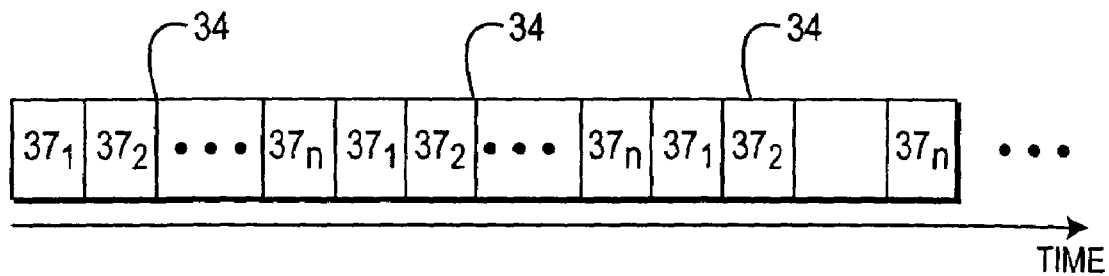
FIG. 1 illustrates time slots in repeating frames of a TDD system.

The preferred embodiments will be described with reference to the drawing figures where like numerals represent like elements throughout.

Figure 2:
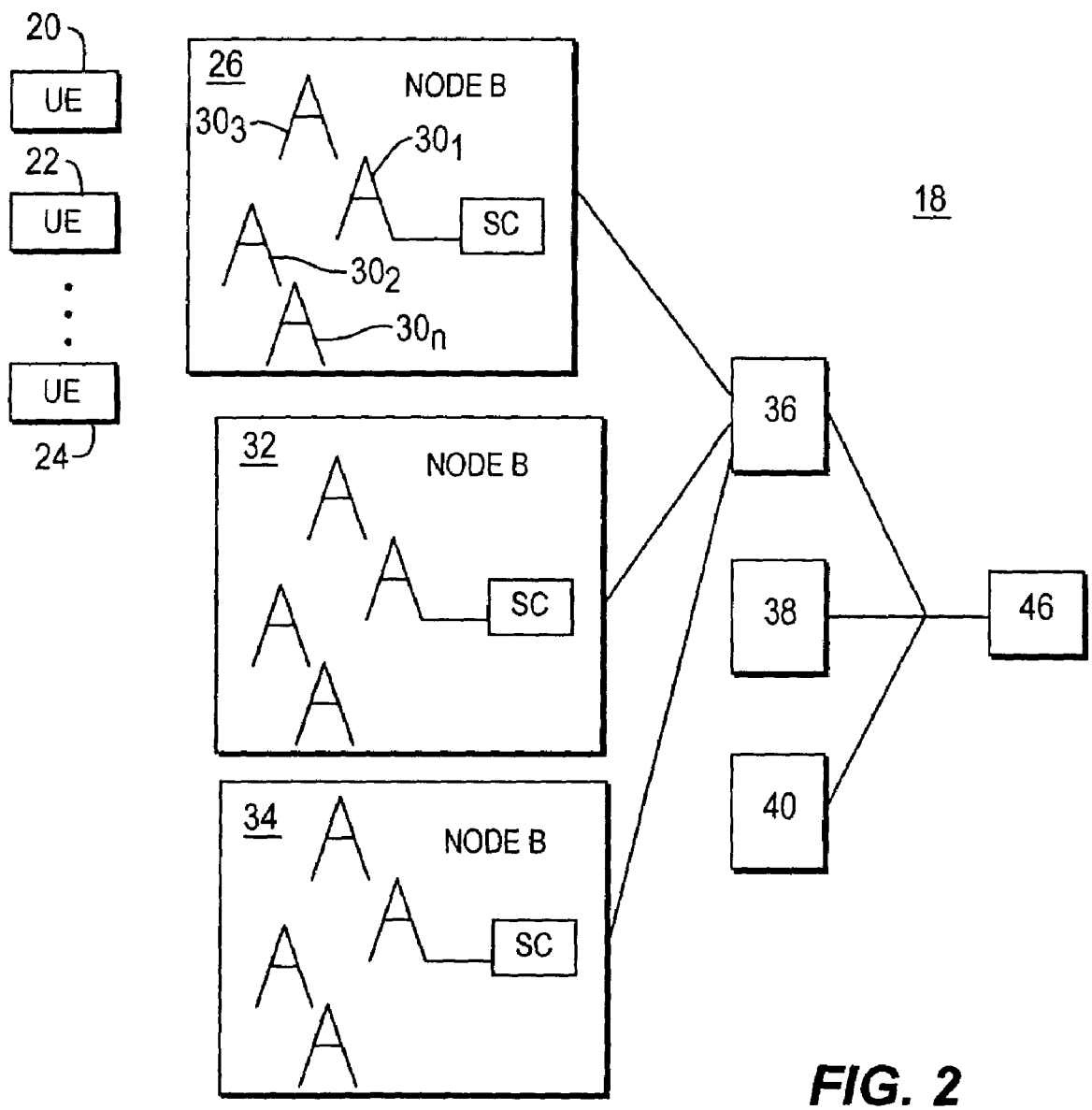
FIG. 2 illustrates a simplified wireless TDD system.

FIG. 2 illustrates a simplified wireless spread spectrum code division multiple access (CDMA) or time division duplex (TDD) communication system 18. The system 18 comprises a plurality of node Bs 26, 32, 34, a plurality of radio network controllers (RNC), 36, 38, 40, a plurality of user equipments (UEs) 20, 22, 24 and a core network 46. The plurality of node Bs 26, 32, 34 are connected to a plurality RNCs 36, 38, 40, which are, in turn, connected to the core network 46. Each Node B, such as Node B 26, communicates with its associated UEs 20–24. The Node B 26 has a single site controller (SC) associated with either a single base station $30_1$, or multiple base stations $30_1 \ldots 30_n$.

Although the present invention is intended to work with one or more UEs, Node Bs and RNCs, for simplicity of explanation, reference will be made hereinafter to the operation of a single UE in conjunction with its associated Node B and RNC.

Figure 3A:
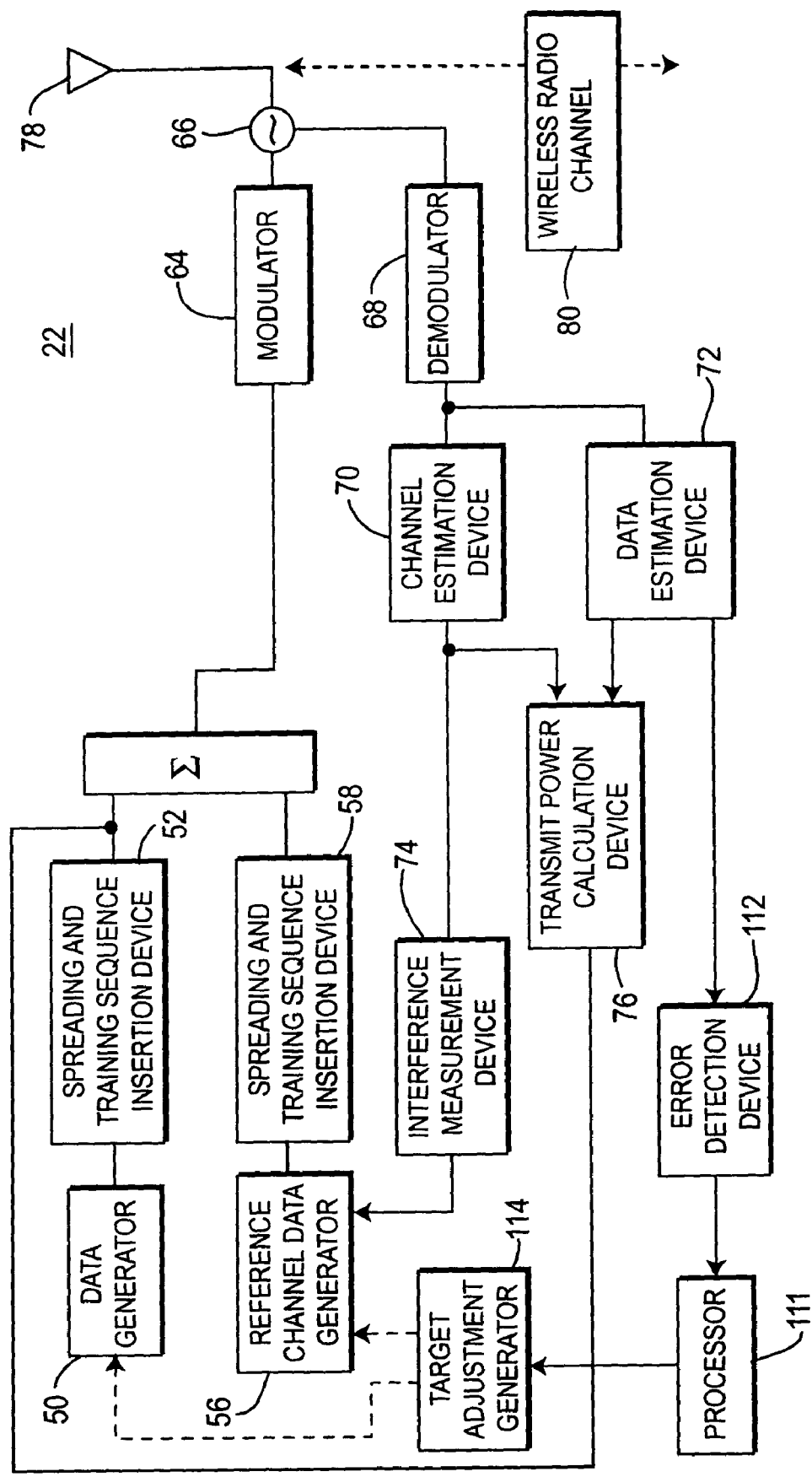
FIGS. 3A and 3B illustrate block diagrams of a UE and base station, respectively.

Referring to FIG. 3A, the UE 22 comprises an antenna 78, an isolator or switch 66, a modulator 64, a demodulator 68, a channel estimation device 70, data estimation device 72, a transmit power calculation device 76, an interference measurement device 74, an error detection device 112, a processor 111, a target adjustment generator 114, a reference channel data generator 56, a data generator 50, and two spreading and training sequence insertion devices 52, 58.

The UE 22 receives various radio frequency (RF) signals including communications from the base station $30_1$ over the wireless radio channel using an antenna 78, or alternatively an antenna array. The received signals are passed through a T/R switch 66 to a demodulator 68 to produce a baseband signal. The baseband signal is processed, such as by a channel estimation device 70 and a data estimation device 72, in the time slots and with the appropriate codes assigned to the UE's 22 communication. The channel estimation device 70 commonly uses the training sequence component in the baseband signal to provide channel information, such as channel impulse responses. The channel information is used by the data estimation device 72, the interference measurement device 74 and the transmit power calculation device 76. The data estimation device 72 recovers data from the channel by estimating soft symbols using the channel information.

Prior to transmission of the communication from the base station $30_1$, the data signal of the communication is error encoded using an error detection/correction encoder 110. The error encoding scheme is typically a CRC followed by a forward error correction encoding, although other types of error encoding schemes may be used. As those skilled in the art know, the data is typically interleaved over all of the time slots and all codes.

Figure 4:
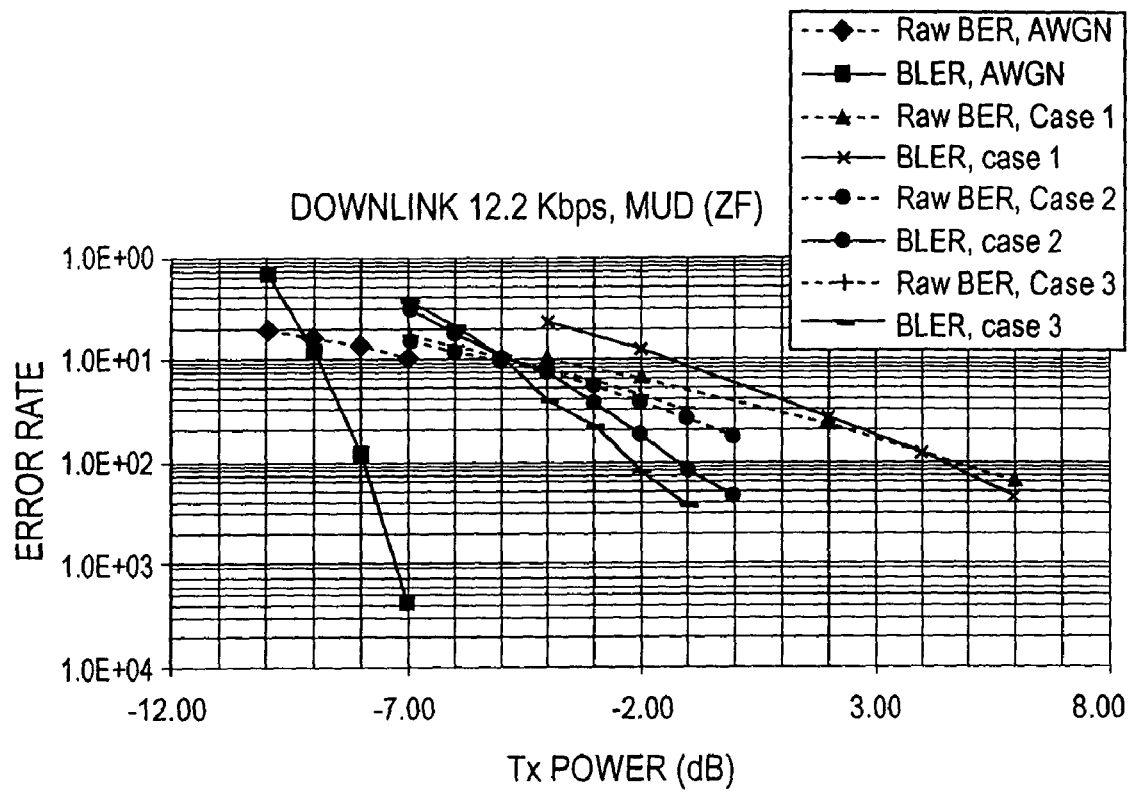
FIG. 4 is a graphical illustration of the mapping of the BLER with a target SIR value.

In accordance with the preferred embodiment of the present invention, downlink outer loop power control is conducted using a channel adaptive downlink outer loop power control, described hereafter. Using the soft symbols produced by the data estimation device 72, the error detection device 112 detects the target BLER sent from the base station $30_1$. Given the target BLER, an initial target $SIR_{Target}$ is generated by mapping the target BLER, using an assumed plausible channel condition, to a SIR value associated with the channel condition. A graphical example of this mapping is illustrated in FIG. 4. The lines on this graph are exemplary propagation conditions, wherein the AWGN channel is the static channel for additive white Gaussian noise, and case 1 through case 4 are fading channels with different multipaths.

As shown in FIG. 4, at a required BLER, for example 0.01 for a case 1 fading channel, a predetermined transmission power can be determined. In the above example, the transmission power is approximately 4.5 dB, from which a target SIR is calculated. It is also shown in FIG. 4 that the $SIR_{Target}$ at BLER of 0.01 for the case 1 fading channel requires more than 5 dB over the $SIR_{Target}$ for the case 2 fading channel. Accordingly, it will take longer to converge to the required $SIR_{Target}$ for a low BLER when assuming the case 1 fading channel and trying to get to the $SIR_{Target}$ for a case 2 fading channel.

In order to get from the SIR for the case 1 channel, the assumed channel, for example, to the required SIR for the case 2 channel, the actual channel for example, a jump algorithm is utilized by the processor 111. Initially, the parameters of the jump algorithm SIR_step_down, SIR_step_up are determined using the target BLER in accordance with the following equations:

$$SIR\_step\_down = SIR\_step\_size * target\_BLER \qquad \text{Equation 1}$$

$$SIR\_step\_up = SIR\_step\_size - SIR\_step\_down; \qquad \text{Equation 2}$$

where SIR_step_size is any predetermined value, preferably a value between 0.3 dB and 0.5 dB. As the error detection device 112 detects an error in a Transmission Time Interval (TTI), a $SIR_{Target}$ value is updated by the processor 111 in accordance with Equation 3:

$$SIR_{Target}(K) = SIR_{Target}(K-1) + SIR\_step\_up(dB) \qquad \text{Equation 3}$$

where K is the number of the TTI. If the error detection device 112 does not detect an error in the TTI, the $SIR_{Target}$ is updated in accordance with Equation 4:

$$SIR_{Target}(K) = SIR_{Target}(K-1) - SIR\_step\_down(dB) \qquad \text{Equation 4}$$

Figure 5:
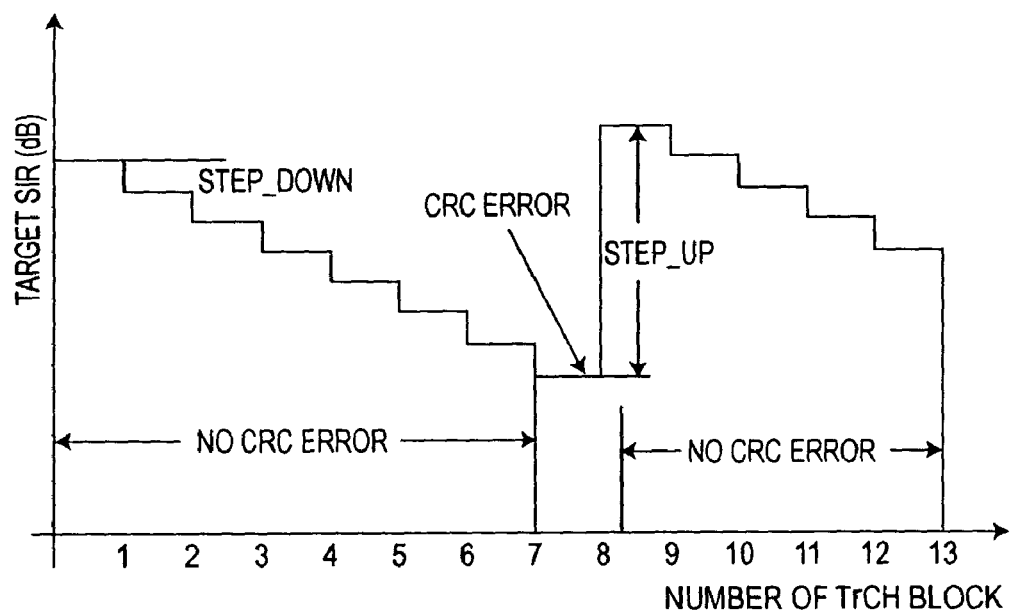
FIG. 5 is an illustration of the jump algorithm in accordance with the present invention.

Also, each time a determination is made by the error detector device 112 whether an error is present in a TTI, a step_up counter or step_down counter is incremented; the step_up counter being incremented each time an error is detected; the step_down counter being incremented otherwise. A graphical representation of the jump algorithm used by the processor 111 to set a target SIR is illustrated in FIG. 5. Again, FIG. 5 illustrates that for communications where the assumed channel condition differs greatly from the actual channel condition, the convergence from an assumed target SIR to an actual SIR may take a long time.

Accordingly, the processor 111 then conducts a channel-adaptive filtering process to further adjust the $SIR_{Target}$. The channel adaptive filtering process includes two (2) filter processes. The first filter process distinguishes the static and dynamic (or fading) channels, and the second filter process characterizes the dynamic channel conditions. These filter processes are conducted sequentially, (i.e. the second after the first), with one another to produce the necessary adjustments to the $SIR_{Target}$ in accordance with actual channel conditions.

Figure 6A:
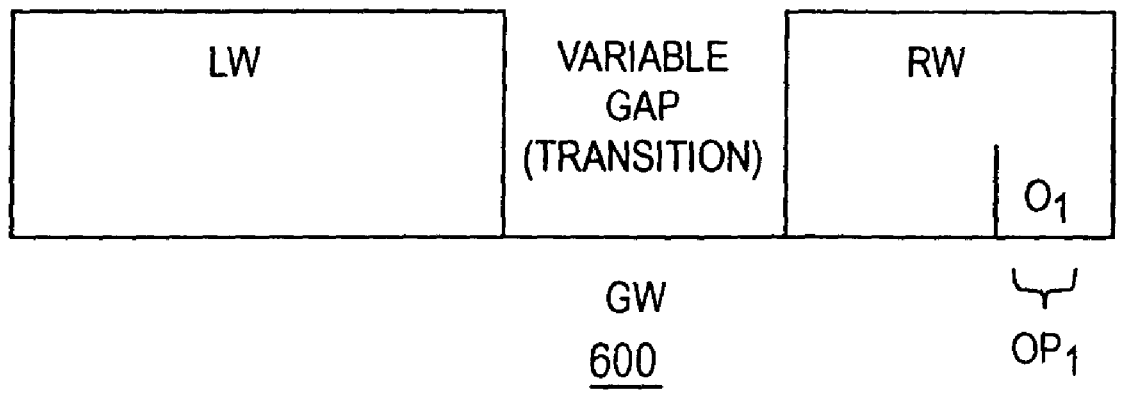
FIGS. 6A and 6B are block diagrams of the split sliding windows for the first and second filter processes.
Figure 6B:
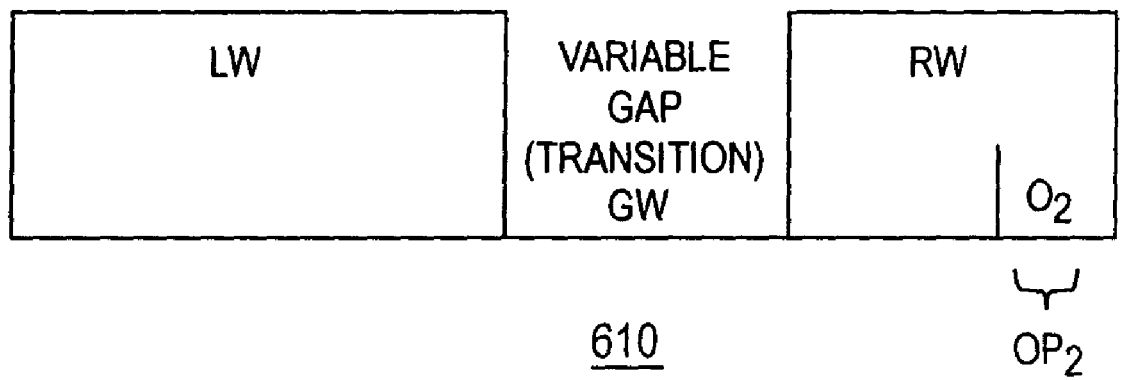

Both of the filter processes perform their respective filter processing using a split sliding window 600, 610. Diagrams of the split sliding windows 600, 610 are shown in FIGS. 6A and 6B, respectively. The split sliding windows 600, 610 comprise a left side window (LW), a variable gap (GW) and a right side window (RW). Each of the respective windows may be any length in size; the length representing the number of values, observations $O_1$, $O_2$, to be determined for each of respective windows LW, RW. GW represents a transition period of channel conditions, which improves the detection of changing channel conditions. For example, if the left side window LW was set to a length of 2, the LW would comprise two observations of the respective sliding windows 600, 610.

Each of the respective sliding windows 600, 610 observations' $O_1$, $O_2$ are generated each observation period $OP_1$, $OP_2$ being any number of time segments within the received communication. For example, the first filter process sliding window 600 may have an observation period $OP_1$ of 100 ms, where one (1) time segment equals 10 ms. Accordingly, one observation $O_1$ is made every ten (10) time segments. This is the case for the second filter process sliding window 610 as well. It should be noted, though, that the observation periods $OP_1$, $OP_2$ of the filter processes may be different. The sliding window moves one step forward per observation period $OP_1$, $OP_2$ and the each of the filtering processes discriminates channel conditions between RW and LW. The values observed/measured $O_1$, $O_2$ within RW and LW are utilized by the filtering processes to generate a SIR adjustment value.

The algorithm characterizes the channel condition based on the power of the strongest path ($P_0$) for static/dynamic channel detection in the first filter process and the power ratio of $P_1/P_0$ (dB) for fading channels, where $P_1$ is the power of the second strongest path. $P_0$ is sampled once per observation period $OP_1$ for the first filter process and $P1/P_0$ (dB), for the second filter process, are averaged once per observation period $OP_2$ for the second filter process. Each observation $O_1$, $O_2$ is stored in the memory to perform filtering by the split sliding windows 600, 610.

Figure 7:
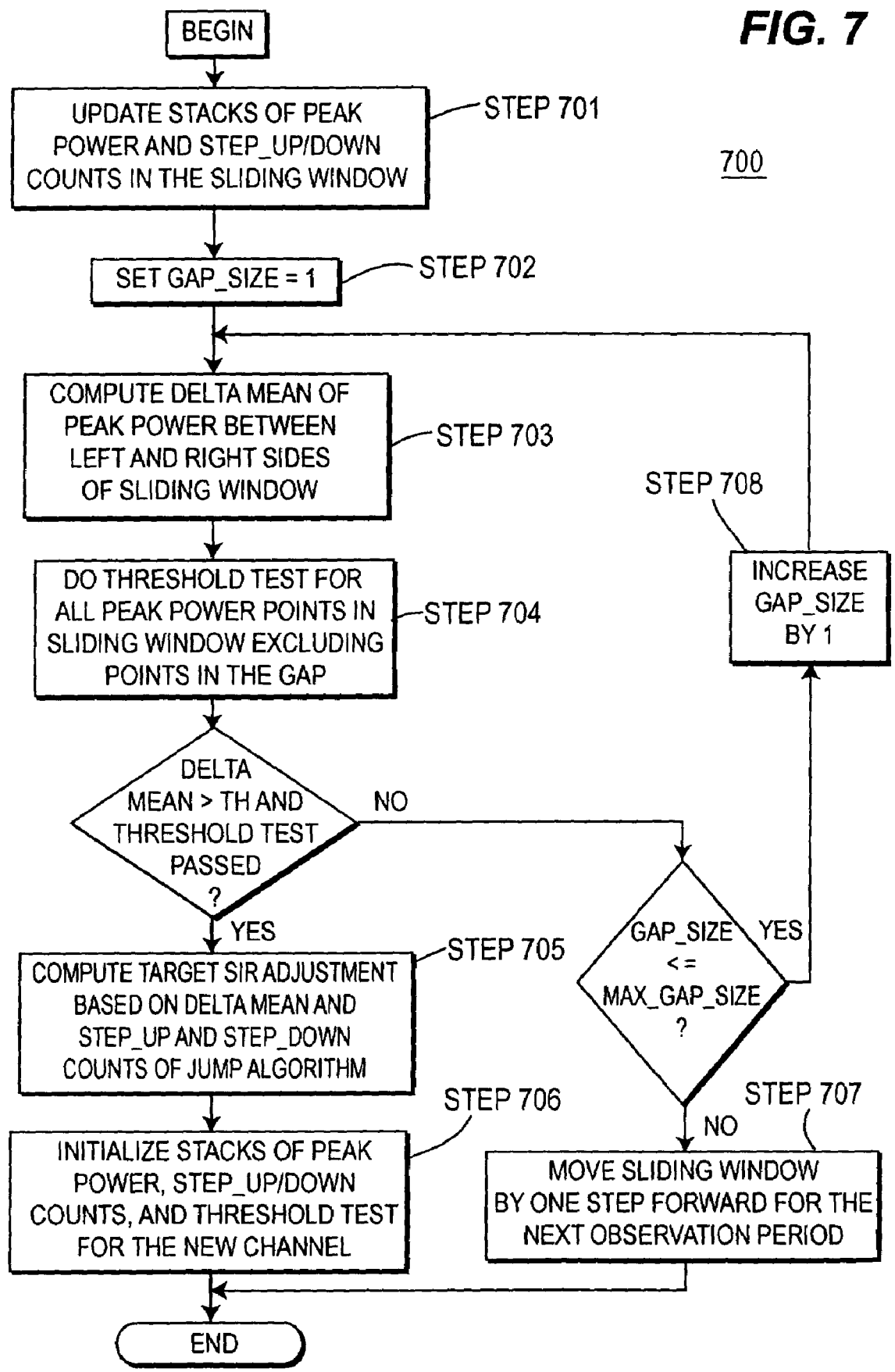
FIG. 7 is a flow diagram of channel discrimination filtering for use in downlink power control.

As stated, the first filtering process 700 distinguishes the static (i.e., path of line of sight) and dynamic channels (i.e. fading multipath), determining whether there is a transition between a dynamic channel and a static channel. FIG. 7 is a flow diagram of the first filtering process 700 in accordance with the preferred embodiment of the present invention. The distinguishing of the static and dynamic channels is conducted using the detected peak power of a predetermined observation period $OP_1$.

As explained above, the first filtering process utilizes the split sliding window, as shown in FIG. 6A, to generate a static adjustment value. Again, the LW and RW can be of any predetermined length. The GW initially is set to one (1) (Step 702) and is increased by one (1) each iteration, to be disclosed hereinafter. The GW, though, has a preset limitation as to how big it can be, for example, 2 or 3.

The processor 111 utilizes the step_up and step_down counts generated in the aforementioned jump algorithm, as well as, the determined power(s) of the strongest path in the LW and RW to calculate the static adjustment value. The first filter process is run after the LW and the RW are filled in with observed/measured peak powers. Accordingly, if the sliding window size was 7, (RW equal 3, LW equals 3 and GW equals 1), 7 observations $O_1$ would have to be observed before the first filter process generates a static adjustment value.

The static adjustment value is calculated in accordance with the following. The mean of the peak values of each observation in the LW and RW and the Δ mean of the peak values are calculated (Step 703) in accordance with Equations 5, 6 and 7 below:

$$\text{mean\_peak}_{RW} = \frac{1}{RW} \sum_{i=1}^{RW} P_0(i) \qquad \text{Equation 5}$$

$$\text{mean\_peak}_{LW} = \frac{1}{LW} \sum_{i=RW+GW+1}^{N} P_0(i) \qquad \text{Equation 6}$$

$$\Delta\text{mean\_peak} = \text{mean\_peak}_{RW} - \text{mean\_peak}_{LW} \qquad \text{Equation 7}$$

Once the Δ mean peak value has been calculated, a threshold test is conducted (Step 704) to determine whether there is a fluctuation among peak powers within each window (LW and RW) and whether there is a change between the RW and LW windows, meaning a change from static to dynamic or dynamic to static channels within the sliding window. The threshold value is a predetermined value, preferably:

$$TH_{mean\_peak}=3.0$$

$$TH\_\text{Peak}_{std,RW}=1.0$$

$$TH\_\text{Peak}_{std,LW}=1.0$$

Th_Peak$_{std,RW}$ and TH_Peak$_{std,LW}$ are thresholds which are related to the standard deviation (std) to detect a fluctuation of peak powers for fading channels. The threshold test compares the Δ mean peak values to the threshold and the peak values of the RW and LW to determine if there is a transition, meaning the channel within the LW is different than the channel within the RW, to determine if the channel within the LW is a static channel when the channel within the RW is a fading channel, and vice versa.

If the LW and RW channels are different and either one is static, the processor 111 sets the jump value SIR$_{jump}$ based on the step_up and step_down counts of the jump process and computes the initial value of the target SIR static adjustment (adjStaticSIRdB) based on the delta mean and BLER (Step 705).

The jump value is set according to Equation 8a.

$$SIR_{jump}=SIR\_\text{step\_up}*\text{step\_up\_count}-SIR\_\text{step\_down}*\text{step\_down\_count} \qquad \text{Equation 8a}$$

The initial value of adjStaticSIRdB, which is an adjustment value relative to an assumed reference dynamic channel, (preferably case 2), is set according to Equation 8b; where the BLER is mapped using the graphs shown FIG. 4.

$$\text{adjStaticSIRdB}=-1.5*\Delta\text{mean peak}*\log 10(1.0/BLER) \qquad \text{Equation 8b}$$

The initial value of adjStaticSIRdB is then modified based on the power ratio, depending on whether the RW channel is static or the LW channel that is static. If the RW channel is the static channel (and the LW channel is the fading channel), the adjStaticSIRdB is modified with the average power ratio of the LW (AvPrevChChar) according to the pseudo code and Equation 9 set forth below:

```
AvPrevChChar = 0;                                    Equation 9
for j = 1:sizeofLW
    AvPrevChChar = AvPrevChChar + prevChChar(1,j + sizeofRW +
    maxsizeofGap − 1);
```

-continued

```
end
AvPrevChChar = AvPrevChChar / sizeofLW;
deltaMean = AvPrevChChar + 10.8;
adjStaticSIRdB = adjStaticSIRdB + 0.4 * deltaMean *
log10(1.0 / BLER).
```

If the LW channel is the static channel (and the RW channel is the fading channel), the adjusted static SIR adjStaticSIRdB is calculated according to Equation 10:

adj$StaticSIR$dB=adj$StaticSIR$dB−0.4*delta mean*log 10(1.0/$BLER$)     Equation 10 where delta mean=7.0.

Once the initial static adjustment is re-calculated, a determination is made as to whether the adjustment is too large, which protects against making large adjustments at one time. This is accomplished by comparing the static adjustment to a maximum adjustment maxadjSIRdB, where max adj$SIR$dB=3*log 10(1/$BLER$).     Equation 11

If the maximum is less than the calculated adjustment, the maximum value is utilized as the static adjustment. The processor 111 then adjusts the static adjustment in accordance with Equation 12:

adj$StaticSIR$dB=adj$StaticSIR$dB−$SIR$jump     Equation 12

Upon the calculation of the static adjustment, the processor 111 initializes the peak power, step_up and step_down counts, and power ratio for the new channel (Step 706). The initialization of the power ratio will set the reference channel to the case 2 assumed reference channel used in Equation 8b, to begin the second filter process. The initialization of the step_up and step_down counts will set Equation 8a to zero in the second filter process so that the SIR$_{jump}$ adjustment is not used twice.

If the threshold test is not passed (i.e., a change between the RW and LW windows is not detected) and the gap size is less than the maximum gap size, the processor 111 increases the gap size by one (1) (Step 708) and the peak values of the LW and RW and Δ mean are recalculated (Step 703). If the GW is at the predetermined maximum, the processor 111 moves the sliding window and begins the next observation period OP$_1$ (Step 707).

Figure 8:
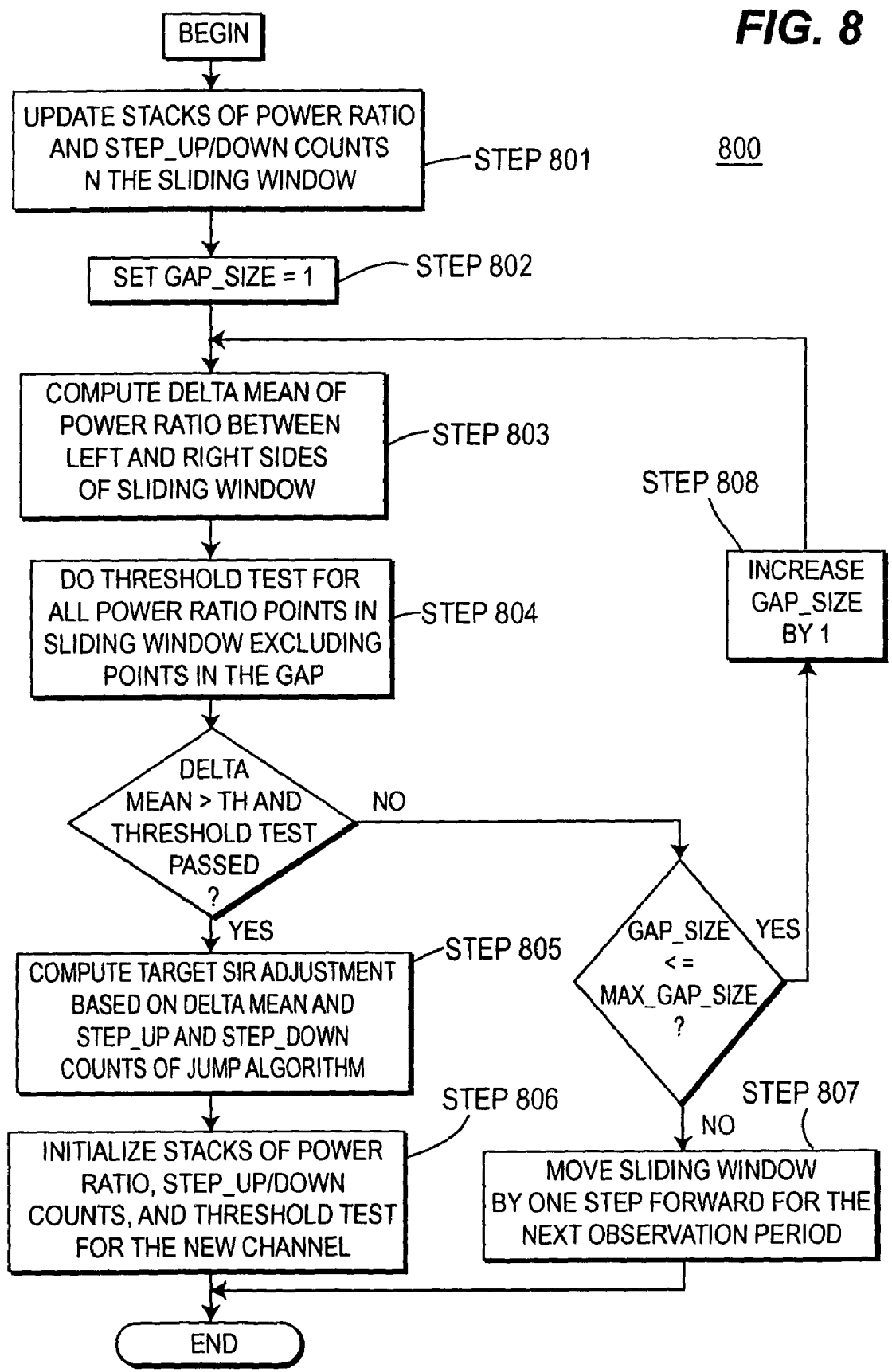
FIG. 8 is a flow diagram of fading channel filtering for use in downlink power control.

As stated above, the processor 111 sequentially conducts the second filter process 800 to generate a dynamic (fading) channel adjustment. The second filter process 800 characterizes fading channel conditions by using a power ratio of multipaths. The flow diagram of the second filtering process 800 is illustrated in FIG. 8. When the first filter process 700 is initially run, the values in the LW and RW of the first filter are accumulated by the observed/measured peak powers, while the values in the LW of the second filter process 800 are predetermined by the power ratios of the assumed plausible channel condition, for example case 1, and the values in the GW and RW of the second filter process 800 are accumulated by the observed/measured power ratios. Once the RW has accumulated an observations O$_2$ worth of data, the power ratio within that observation O$_2$ is determined. Those predetermined power ratio values within the LW and any second or third observed/measured value within RW are used by the processor 111 to determine the adjustment value.

Similar to the first filter process 700, the second filter process 800 computes the mean difference of the LW and RW power ratio values computed in each. As stated earlier, the sliding window for the second filter process 800 comprises a LW, RW and GW, which can be of any predetermined length (Step 803). The power ratio for each observation in each window is computed according to Equation 13 below:

$$P_{10}(i) = \frac{1}{N_{obs}} \sum^{N_{obs}} 10 * [\log(P_1(j)) - \log10(p_0(j))]$$     Equation 13 where N$_{obs}$ is the number of samples per observation period OP$_2$, P$_0$(j) is the power of the strongest path and P$_1$(j) is the power of the second strongest path.

The mean power ratios and the delta mean (Δmean) are then calculated in accordance with equations 14, 15 and 16 below:

$$mean_{RW} = \frac{1}{RW} \sum_{i=1}^{RW} P_{10}(i)$$     Equation 14

$$mean_{LW} = \frac{1}{LW} \sum_{i=RW+GW+1}^{N} P_{10}(i)$$     Equation 15

$$\Delta mean = mean_{RW} - mean_{LW}$$     Equation 16

Similar to the first filter process 700, threshold values are generated and the mean and power ratios of the RW and LW are compared to the threshold (Step 804). The threshold values are computed in accordance with the following pseudo-code:

```
if((mean_LW > -7.0)&(mean_RW > -7.0))
    TH_mean = 2.0;
    TH_std,LW = abs(0.35 * Δmean);
    TH_std,RW = abs(0.5 * Δmean);
else
    TH_mean = 3.0;
    TH_std,LW = abs(0.3 * Δmean);
    TH_std,RW = abs(0.5 * 0.3 * Δmean);
End
``` where −7.0 represents the fading channel conditions that have weak second path or no second path.

If the mean difference and the power ratio values of the RW and LW are within the threshold range, the processor 111 sets the SIR$_{jump}$ and an initial fading channel SIR adjustment (Step 805) according to Equations 17 and 18, below:

$SIR_{jump}$=$SIR$_step_up*step_up_count−
    $SIR$_step_down*step_down_count     Equation 17

$SIR_{target}^{adj}$=$a$*Δmean*log 10(1/$BLER$)     Equation 18 where the BLER is again mapped from the assumed reference channel.

If the initial SIR$_{target}^{adj}$ is greater than a maximum adjustment, max adj$SIR$dB=3*log 10(1/$BLER$)     Equation 19 then the $SIR_{target}^{adj}$ is set to maxadjSIRdB. The processor 111 then adjusts the initial or maximum adjustment $SIR_{target}^{adj}$ by $SIR_{jump}$:

$$SIR_{target}^{adj} = SIR_{target}^{adj} - SIR_{jump} \quad \text{Equation 20}$$

The $SIR_{target}^{adj}$ presents a fading channel adjustment to the assumed reference channel. For example, if the assumed reference channel is case 2 and the actual channel condition is a case 3 channel, the $SIR_{target}^{adj}$ adjusts the static adjustment generated by the first filter process 700 to reduce or increase the static adjustment value so that the target SIR sent to the base station represents actual channel conditions of the case 3 channel.

If the threshold test is not passed, the second filter process operates similar to the first filter process in that the gap size is incremented by one (1) (Step 808) if it is not greater than or equal to the maximum gap size, or the sliding window moves by one step forward for the next observation period (Step 807) and the $SIR_{target}^{adj}$ is set to 0.

Each time an observation is completed for the first and/or second filter process, the $SIR_{Target}$ is determined according to Equation 21, below:

$$\text{target\_}SIR(k) = \text{target\_}SIR(k-1) + \text{adjstatic}SIR\text{dB} + SIR_{target}^{adj} \quad \text{Equation 21}$$

The processor 111 determines the adjustment of the base station transmit power by comparing the measured SIR with the $SIR_{Target}$. Using this comparison, a TPC command is subsequently sent to the base station 80.

Figure 3B:
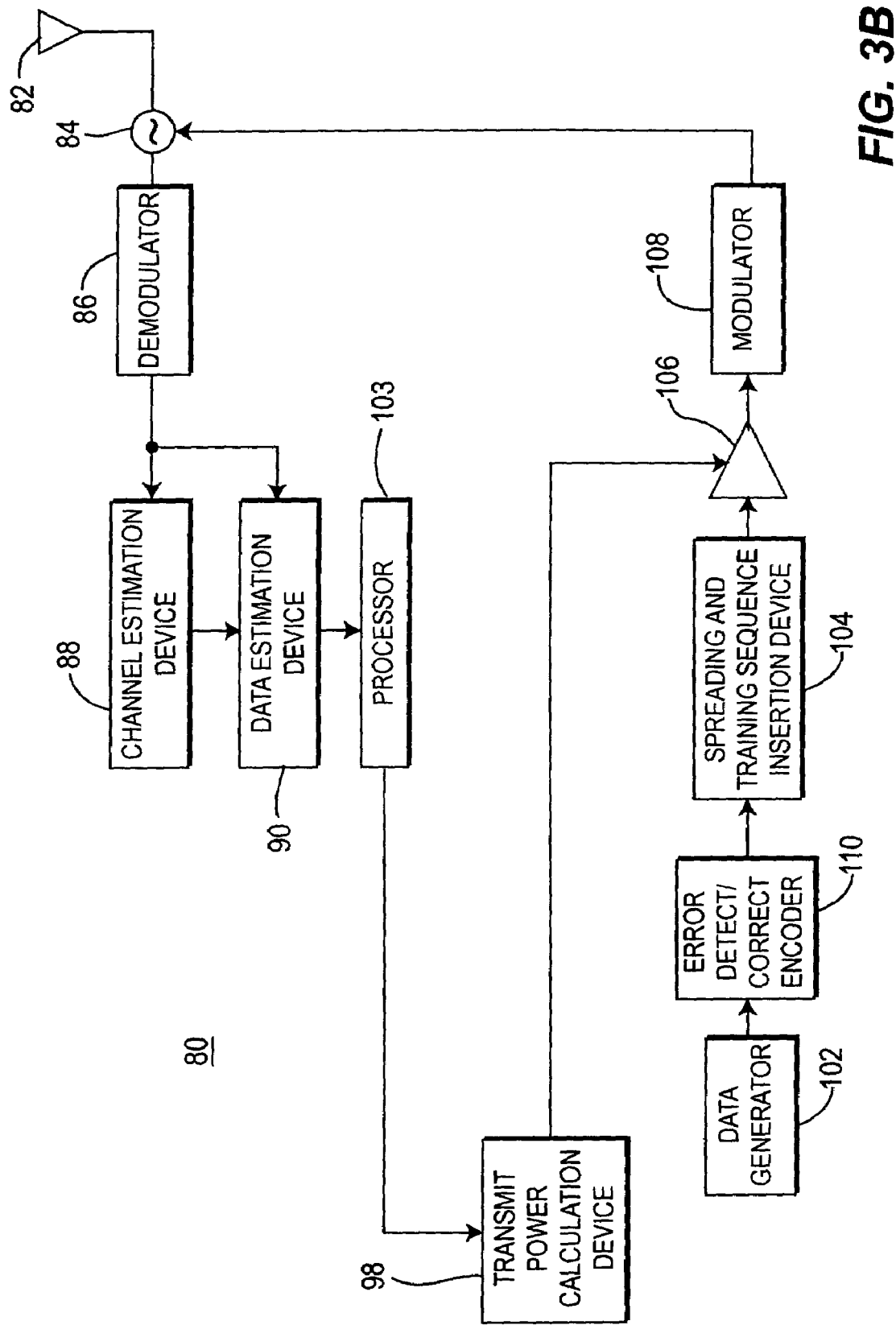

Referring to FIG. 3B, the base station 80 comprises, an antenna 82, an isolator or switch 84, a demodulator 86, a channel estimation device 88, a data estimation device 90, processor 103, a transmission power calculation device 98, a data generator 102, an encoder 110, an insertion device 104 and a modulator 106. The antenna 82 or, alternately, antenna array of the base station 30₁ receives various RF signals including the TPC command. The received signals are passed via a switch 84 to a demodulator 86 to produce a baseband signal. Alternatively separate antennas may be used for transmit or receive functions. The baseband signal is processed, such as by a channel estimation device 88 and a data estimation device 90, in the time slots and with the appropriate codes assigned to the communication burst of the UE 22. The channel estimation device 88 uses the training sequence component in the baseband signal to provide channel information, such as channel impulse responses. The channel information is used by the data estimation device 90. The data information is provided to the transmit power calculation device 98 by processor 103.

Processor 103 converts the soft symbols produced by the data estimation device 90 to bits and extracts the TPC command associated with the CCTrCH. The transmit power calculation device 98 increases or decreases the transmission power for the CCTrCH by the predetermined step size according to the TPC command.

Data to be transmitted from the base station 30₁ is produced by data generator 102. The data is error detection/correction encoded by error detection/correction encoder 110. The error encoded data is spread and time-multiplexed with a training sequence by the training sequence insertion device 104 in the appropriate time slot(s) and code(s) of the assigned physical channels, producing a communication burst(s). The spread signal is amplified by an amplifier 106 and modulated by modulator 108 to radio frequency. The gain of the amplifier is controlled by the transmit power calculation device 98 to achieve the determined transmission power level for each time slot. The power controlled communication burst(s) is passed through the isolator 84 and radiated by the antenna 82.

Figure 9:
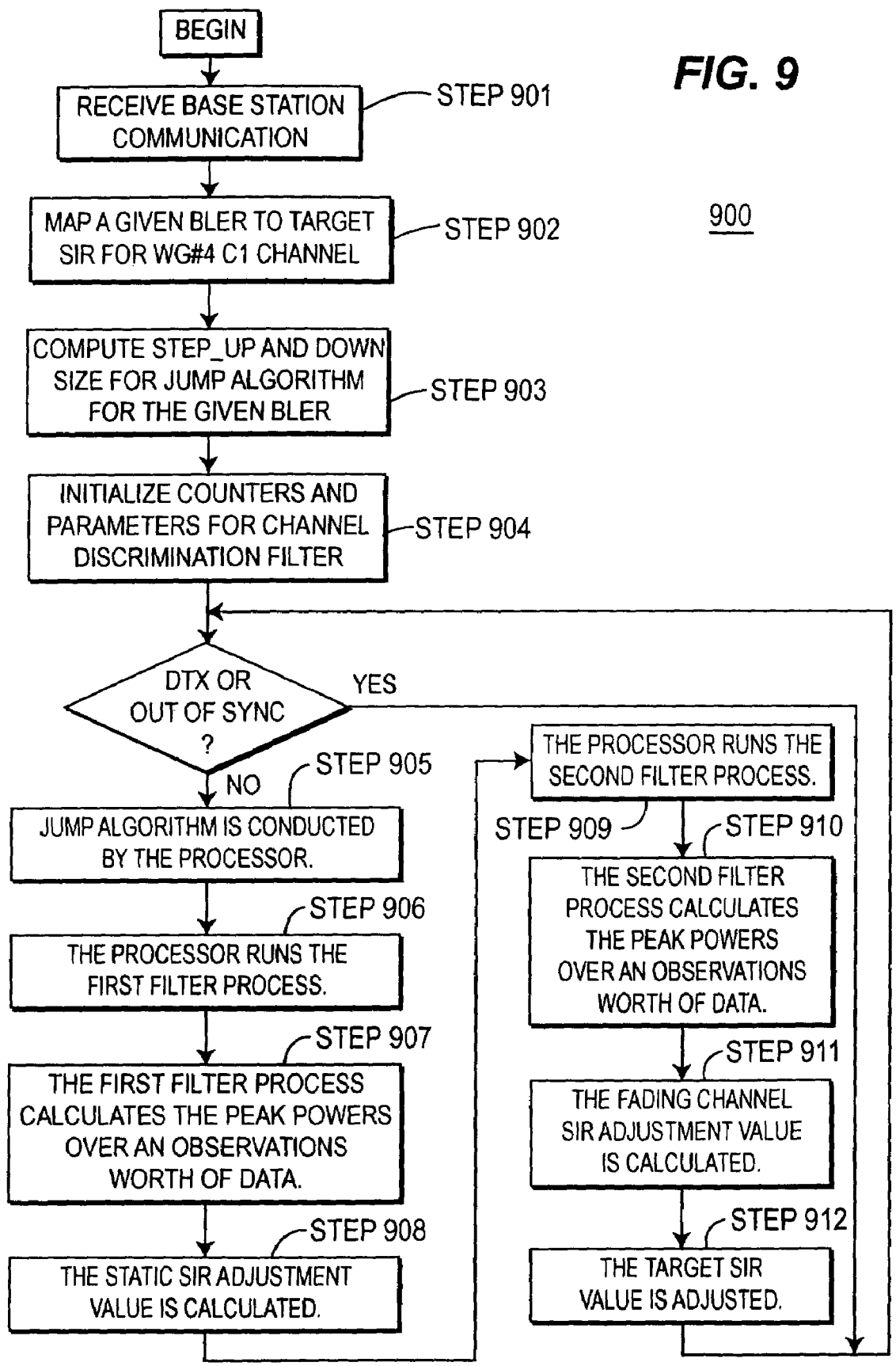
FIG. 9 is a flow diagram of a channel-adaptive downlink outer-loop power control algorithm of the present invention.

The flow diagram of the channel-adaptive downlink outer-loop power control algorithm of the present invention is illustrated in FIG. 9. A target BLER is communicated to the receiver 10 from the base station 30, (Step 901). Using the received target BLER, a target SIR is obtained for a given channel (Step 902) and the step_up and step_down sizes for the jump algorithm are calculated (Step 903). The step_up and step_down counters are initialized and the parameters for the first and second filter processes are set (i.e., observation periods) (Step 904).

If the receiver 10 is synchronized with the base station and there is no discontinuation of transmission (DTX), the jump algorithm is conducted by the processor 111 (Step 905). Upon the generation of the $SIR_{Target}$ by the jump algorithm, the processor 111 conducts the first filter process (Step 906) to generate a static adjustment value. Once the first filter process has accumulated enough observations to fill the first sliding window, the process calculates the peak power (Step 907) and generates the static SIR adjustment (Step 908). The processor 111 then conducts the second filter process (step 909). The power ratios are calculated for each observation $O_2$ within the second filter window (step 910) and generates the fading channel adjustment (Step 911). The $SIR_{Target}$ is then adjusted according to the adjustment values generated by the first and second filter processes respectively 700, 800 (Step 912).

The downlink outer loop power control algorithm, in accordance with the preferred embodiment of the present invention utilizes a jump algorithm and a channel-adaptive algorithm to mitigate the channel error and adapts to the time-varying channel conditions. If the channel-adaptive algorithm uses more samples of P0 and P1/P0 per frame or uses PCCPCH of SCH prior to the TPC, it could shorten the convergence time. Hence the channel-adaptive outer-loop power control algorithm will meet the desirable convergence time and reduce the battery power consumption in the uplink TPC and interference in the downlink TPC (results in more capacity). The channel-adaptive algorithm can be extended by adding more features, P2/P0, P3/P0, the number of multi-paths, etc. to improve performance. Since the algorithm is general, it can be applied to the uplink TPC of TDD and the uplink/downlink TPC of FDD.

While the present invention has been described in terms of the preferred embodiment, other variations which are within the scope of the invention as outlined in the claims below will be apparent to those skilled in the art.

The invention claimed is:

1. A method for controlling outer loop transmit power for transmission power control of an uplink/downlink communication in a wireless communication system where a user equipment (UE) produces a target power level based upon received signals which it communicates to a base station from which the signals are received, the method comprising the steps of:
   receiving at the UE a communication in the form of a series of communication segments from a base station;
   analyzing the received communication within first and second composite windows;
   periodically distinguishing between static and dynamic channel conditions in communication segments within the first and second windows;
   generating a static adjustment value when the respective channel conditions of the communication segments in said first and second windows are different; and adjusting the target power level in response to the static adjustment value.

2. The method of claim 1 wherein:

said first composite window has a predefined first window of a first length of a predetermined number of communication segments and a non-overlapping second window of a second length of a predetermined number of communication segments, such that each segment of the communication is first analyzed in the first window and subsequently analyzed in the second window; and said second composite window has a predefined third window of a third length of a predetermined number of communication segments and a non-overlapping fourth window of a fourth length of a predetermined number of communication segments, such that each segment of the communication is first analyzed in the third window and subsequently analyzed in the fourth window.

3. The method of claim 2 further comprising:

periodically characterizing dynamic channel conditions in communication segments within the third and fourth windows to generate a dynamic adjustment value; and adjusting the target power level in response to the static adjustment value.

4. The method of claim 3 further comprising the steps of:

receiving from the base station a detected target power level;

detecting an error signal; and adjusting the detected target power level in response to said detection of the error signal to generate the target power level before adjusting the target power level in response to the static and dynamic adjustment values.

5. The method of claim 3 wherein:

said distinguishing step includes the steps of:

detecting a peak power point of said communication segments each observation O1 for said first and second windows, respectively;

comparing said detected peak power points to a predefined threshold value;

determining which of the first and second windows includes static channel conditions based upon said comparison; and calculating said static adjustment value in response to said determination; and said characterizing step includes the steps of:

detecting peak power ratios of said communication segments each observation O2 for the third and fourth windows, respectively;

comparing said detected power ratios to a second threshold value, said second threshold value being based in part on said peak power ratios; and generating the dynamic adjustment value when the comparison is within the threshold.

6. The method of claim 5 wherein:

said first window and said second window are separated by a first transition window of a fifth length and said first transition window is adjusted when said detected peak power points are not within the threshold value; and said third and fourth windows are separated by a second transition window of a sixth length, and said second transition window is adjusted when said detected power ratios are not within said second threshold.

7. The method of claim 2 wherein said third and fourth windows include a respective predetermined number of observations O2, said observation O2 being equal to a fixed number of communication segments and representing a time period OP2, and said periodic characterizing of the dynamic channel conditions is based upon values determined from each observation O2.

8. The method of claim 9 wherein said characterizing step comprises the steps of:

detecting peak power ratios of said communication segments each observation O2 for the third and fourth windows, respectively;

comparing said detected power ratios to a second threshold value, said second threshold value being based in part on said peak power ratios; and generating the dynamic adjustment value when the comparison is within the threshold.

9. The method of claim 8 wherein said third and fourth windows are separated by a second transition window of a sixth length, and said second transition window is adjusted when said detected power ratios are not within said second threshold.

10. The method of claim 9 wherein the period of said characterizing is OP2.

11. The method of claim 1 wherein said first and second windows include a respective predetermined number of observations O1, each said observation O1 equal to a fixed number of communication segments and representing a time period OP1; and said periodic distinguishing between static and dynamic channel conditions is based upon values determined from each observation O1.

12. The method of claim 11 wherein said distinguishing step includes the steps of:

detecting a peak power point of said communication segments each observation O1 for said first and second windows, respectively;

comparing said detected peak power points to a predefined threshold value;

determining which of the first and second windows includes static channel conditions based upon said comparison; and calculating said static adjustment value in response to said determination.

13. The method of claim 12 wherein said first window and said second window are separated by a first transition window of a fifth length and said first transition window is adjusted when said detected peak power points are not within the threshold value.

14. The method of claim 11 wherein said period of said distinguishing is equal to P1.

15. The method of claim 1 wherein said first and second windows include a respective predetermined number of observations O1, each said observation O1 equal to a fixed number of communication segments and representing a time period OP1; and said periodic distinguishing between static and dynamic channel conditions is based upon values determined from each observation O1;

said third and fourth windows include a respective predetermined number of observations O2, said observation O2 being equal to a fixed number of communication segments and representing a time period OP2, and said periodic characterizing of the dynamic channel conditions is based upon values determined from each observation O2.

16. The method of claim 15 wherein said period of said distinguishing is equal to P1, and the period of said characterizing is OP2.

17. The method of claim 16 wherein said observations O1 and O2 are not equal.

18. A receiver in a wireless communication system where a user equipment (UE) produces a target power level based upon received signals which it communicates to a base station from which the signals are received, which controls outer loop transmit power for transmission power control of an uplink/downlink communication and receives a communication in the form of a series of communication segments from a base station, comprising:

an error detection device for determining whether an error is present in a transmission time interval (TTI); and a processor in communication with the error detection device, the processor for generating the target power level which is communicated to said base station and analyzing the received communication within first and second composite windows.

19. The receiver of claim 18, wherein:

said first composite window has a predefined first window of a first length of a predetermined number of communication segments and a non-overlapping second window of a second length of a predetermined number of communication segments, such that each segment of the communication is first analyzed in the first window and subsequently analyzed in the second window, for periodically distinguishing between static and dynamic channel conditions in communication segments within the first and second windows and generating a static adjustment value when the respective channel conditions of the communication segments in said first and second windows are different;

said second composite window has a predefined third window of a third length of a predetermined number of communication segments and a non-overlapping fourth window of a fourth length of a predetermined number of communication segments, such that each segment of the communication is first analyzed in the third window and subsequently analyzed in the fourth window, for periodically characterizing dynamic channel conditions in communication segments within the third and fourth windows to generate a dynamic adjustment value; and said processor adjusts the target power level in response to the static and dynamic adjustment values.

20. The receiver of claim 19 wherein:

said received communication includes a detected target power level;

said processor further receives an error signal from said error detection device; and the detected target power level is adjusted in response to said detection of the error signal to generate the target power level before adjusting the target power level in response to the static and dynamic adjustment values.

21. The receiver of claim 19 wherein said first and second windows include a respective predetermined number of observations O1, each said observation O1 equal to a fixed number of communication segments and representing a time period OP1; and said periodic distinguishing between static and dynamic channel conditions is based upon values determined from each observation O1.

22. The receiver of claim 19 wherein said first window and said second window are separated by a first transition window of a fifth length and said first transition window is adjusted when the first and second windows are not different.

23. The receiver of claim 19 wherein said period of said distinguishing is equal to P1.

24. The receiver of claim 19 wherein said third and fourth windows include a respective predetermined number of observations O2, said observation O2 being equal to a fixed number of communication segments and representing a time period OP2, and said periodic characterizing of the dynamic channel conditions is based upon values determined from each observation O2.

25. The receiver of claim 19 wherein said third and fourth windows are separated by a second transition window of a sixth length.

26. The method of claim 24 wherein the period of said characterizing is OP2.

27. The receiver of claim 19 wherein said first and second windows include a respective predetermined number of observations O1, each said observation O1 equal to a fixed number of communication segments and representing a time period OP1; and said periodic distinguishing between static and dynamic channel conditions is based upon values determined from each observation O1;

said third and fourth windows include a respective predetermined number of observations O2 said observation O2 being equal to a fixed number of communication segments and representing a time period OP2, and said periodic characterizing of the dynamic channel conditions is based upon values determined from each observation O2.

28. The receiver of claim 27 wherein said period of said distinguishing is equal to P1, and the period of said characterizing is P2.

29. The receiver of claim 28 wherein said observations O1 and O2 are not equal.

* * * * *

UNITED STATES PATENT AND TRADEMARK OFFICE
CERTIFICATE OF CORRECTION

| | | |
|---|---|---|
| PATENT NO. | : 7,016,699 B2 | Page 1 of 1 |
| APPLICATION NO. | : 10/663528 | |
| DATED | : March 21, 2006 | |
| INVENTOR(S) | : Koo et al. | |

It is certified that error appears in the above-identified patent and that said Letters Patent is hereby corrected as shown below:

At column 1, line 59, after the word "a", delete "targetSIR" and insert therefor --target SIR--.

At column 2, line 37, after the word "target", delete "SIRs" and insert therefor --SIR--.

At column 5, line 35, after the word "and", delete "P1/$P_0$" and insert therefor --$P_1/P_0$--.

At column 6, line 30, before the word "and", delete "Th_Peak$_{stdRW}$" and insert therefor --TH_Peak$_{stdRW}$--.

At column 7, line 62, after the word "an", delete "observations" and insert therefor --observation's--.

At column 8, line 5, after "prises", delete "a" and insert therefor --an--.

At column 8, line 12, in Equation 13 delete "10*[log$P_1$(j)) - log10($p_0$(j))]" and insert therefor --10*[log10($P_1$(j)) - log10($P_0$(j))]--.

At column 8, line 51, after the word "weak", insert --a--.

At column 10, line 7, after the word "station", delete "30," and insert therefor --$30_1$--.

At column 10, line 35, after the word "of", delete "P0 and P1/P0" and insert therefor --$P_0$ and $P_1/P_0$--.

At column 10, line 42, after the word "features", delete "P2/P0, P3/P0" and insert therefor --$P_2/P_0$, $P_3/P_0$--.

Signed and Sealed this

Fourteenth Day of November, 2006

JON W. DUDAS
*Director of the United States Patent and Trademark Office*